United States Patent Office 3,827,943
Patented Aug. 6, 1974

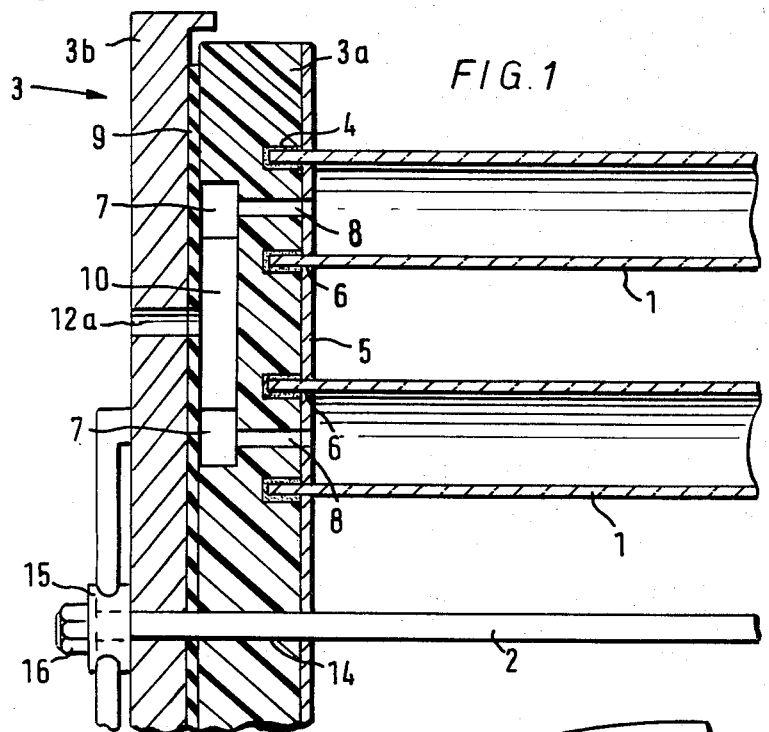
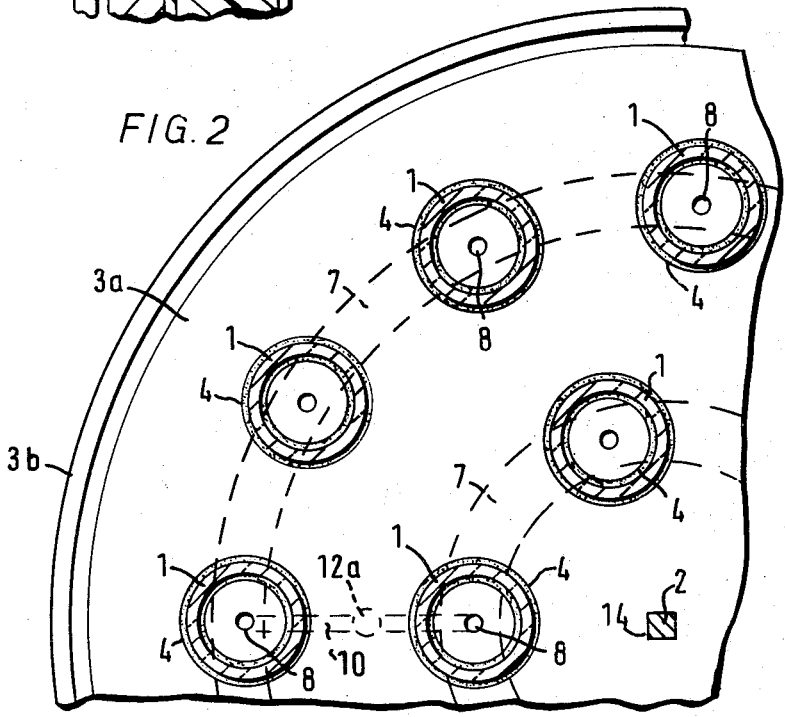

3,827,943
CULTURE APPARATUS
George Forbes Mann, London, England, assignor to Burroughs Wellcome Co., Research Triangle Park, N.C.
Filed Sept. 9, 1971, Ser. No. 179,032
Claims priority, application Great Britain, Sept. 17, 1970, 44,432/70
Int. Cl. C12b 1/04
U.S. Cl. 195—127
10 Claims

ABSTRACT OF THE DISCLOSURE

A culture vessel, comprising a plurality of parallel culture tubes of substantially uniform length mounted around a centrally positioned supporting member by manifold plates at each of its two ends exerting axial pressure on the tubes to seal the ends thereof, the two plates (a) having communicating channels, which are adapted to interconnect all the tubes and are provided with a common inlet/outlet first opening on one of the end-plates which can be connected to a service tube equipped with flow controlling means, and a common second opening on the other end-plate which can be used with a filter tube, (b) being mounted on the supporting member and (c) being adapted to locate and hold the tubes to form a sealed vessel capable of being detached from general supporting means and being rolled by driving means, and its use in the cultivation of microbiological material in liquid suspension.

This invention relates to an apparatus for the cultivation of cells in liquid media and to a process for the cultivation of cells using the above apparatus.

Traditionally cell cultures were grown as monolayers on flat glass surface of stationary vessels, conventionally 50 ml. to 3 litre size prescription-type bottles. However, such systems were not amenable to the large-scale manufacture of, for example, biological products, in view of certain inherent disadvantages, such as the number of bottles and hence large incubator and laboratory space required, and the high handling cost.

Rolled cell cultures were therefore developed in which round bottles initially, and later longitudinal containers rigidly mounted within a cylindrical framework and interconnected with a multitude of inlet and outlet pipes, valves and accessories, were rolled at a low speed. In these systems a somewhat greater surface area per vessel was provided for cell growth and it became possible to increase the concentration of cells in the medium. However, each separate manipulation or handling of individual parts or accessories of these systems, such as filling with liquid, emptying the vessel or supplying the system with gas, still represented a risk of contamination by extraneous agents occurring in some units of a large production batch. The potential usefulness for virus cultivation, where such contamination must be avoided, was thereby limited.

It has now been found that the use of a culture vessel comprising a plurality of tubes held firmly and interconnected by special end-plates acting as manifolds, each having a single inlet/outlet tube, markedly reduces the risk of infection under the conditions of operation, while at the same time providing a greatly increased surface area for the monolayer culture. Thus by varying the length and number of the tubes, the surface area may be varied as required from less than 95 to greater than $13 \times 10^3$ cm.$^2$, that is up to about 10 times that of previous single rolled culture vessels. At the same time the gas/fluid volume ratio and medium volume/surface area can be kept constant irrespective of the scale, providing uniform conditions and consequent reliability for standard biological processes.

Furthermore the vessel and the apparatus incorporating it is readily adaptable to discontinuous or continuous perfusion with gases or solutions or mixture thereof, and in this manner (a) the pH control may be improved as compared to sealed bottles,
(b) inhibition of cell growth by toxic metabolites or through lack of nutrient may be reduced,
(c) toxic agents, viruses, desirable metabolites or biochemical products released into the medium may be removed or collected by changing the medium or by perfusion, or
(d) the vessel or apparatus may be incorporated in an automated system, whereby all operations are carried out "in-line" in a predetermined sequence, each operation being a pre-set duration, thus permitting savings in floor area, labour, and manipulation costs.

The vessel and apparatus may therefore be used for a variety of purposes, each requiring special processing conditions, attachments and appropriate auxiliary equipment. In addition to growing cells in monolayers, the vessel can be adapted for processing in suspended culture and is suitable for propagating viruses in cells maintained in a culture medium.

According to the present invention there is provided therefore a culture vessel, comprising a plurality of parallel culture tubes of substantially uniform length mounted around a centrally positioned supporting member by manifold plates at each of its two ends exerting axial pressure on the tubes to seal the ends thereof, the two plates (a) having communicating channels, which are adapted to interconnect all the tubes and are provided with a common inlet/outlet first opening on one of the end-plates which can be connected to a service tube equipped with flow controlling means, and a common second opening on the other end-plate which can be used with a filter tube, (b) being mounted on the supporting member and (c) being adapted to locate and hold the tubes to form a sealed vessel capable of being detached from general supporting means and being rolled by driving means.

The culture tubes should have preferably a circular cross section with an internal diameter of from 1 to 10 cm., most preferably 4 cm., and be made of metal or plastic, or preferably glass withstanding rapid heating or cooling such as Pyrex glass (registered trademark). A bore of 4 cm. and a volume of 0.2 ml. of medium per cm.$^2$ of surface area gives a 4/1 gas/fluid volume ratio which is most satisfactory for most purposes where there is no continuous gas control. If necessary, gas control can easily be applied to the vessel by regulating for instance the carbon dioxide content of the air within the vessel, and in such cases gas/liquid ratios different from the above may be nearer to the optimum.

A feature of the central supporting member which is conveniently a tie rod, preferably of square cross-section, with means adapted to hold the end-plates, is its inherent simplicity providing uniformity of pressure on the tubes and greatly easing problems of assembly and speed of handling. Moreover a central support allows for instance the ready inspection of the tubes and their contents, if the tubes are transparent, so that the cells may be examined microscopically through the glass to check the normal growth and the propagation of the viruses at each stage in the production of the vaccine. This reduces the risk of contamination, since there is no need to open up the sterile system for certain tests. Of course, the simple tie rod may be replaced by a plurality of structures forming for instance a bunch of supporting members disposed to provide uniform pressure distribution, allowing however easy access to the tubes, the monitoring of their contents and simple assembly.

The manifold plates may be constructed from steel or preferably a plastic of a strength providing the required pressure on the tubes without serious warping or distortion. Nylon or acetal copolymers, e.g. "Kematol" (registered trademark) give a considerable weight advantage and are therefore preferable. The plates provide a convenient and simple means of locating and firmly holding the tubes in position by axial pressure on them, and in addition may incorporate gaskets for the rims of the tubes to aid the sealing of the whole system. Soft tube sealing materials may for instance be recommended for the purpose, since these provide good sealing without making the dissembling of the vessel unduly difficult. "Rubazote" Types X771 and X833 (registered trademark) manufactured by Expanded Rubber and Plastics Limited, have been found convenient for the purpose.

If the plates are composed of two or more parts the components may have gaskets for instance of hard rubber or silicone between them to provide watertight sterile conditions.

The communicating channels, which are contained within the manifold plate and through which the liquid medium may circulate and pass to or from the tubes, allow a single set of manipulations, such as filling or emptying, to operate the entire tube system. These channels may consist of suitable interconnecting tunnels or ducts leading from the tubes to common openings or ports to be connected to other servicing or gas filtering means.

The channels may be formed by assembling the plate for instance from two parts, each having appropriate grooves or recesses, which are conveniently circular or annular, with orifices leading to the surfaces enclosed by the tube rims and having in addition intercommunicating passages, and being adapted to form the manifold when laid and joined together face to face. However preferably the channels are contained entirely within that plate part which also locates the tubes, for instance in a form of groove on the surface adjacent to the gasket between the two plate parts. The whole plate is preferably of a circular disc shape having an appropriate cylindrical surface for rolling on free or driving wheels or rollers.

The surface of the manifold plate facing the parallel tube system may be appropriately recessed to provide a location for each tube. These recesses are usually circular or annular and can be connected with the interconnecting channels through one or more orifices located either centrally or nearer to the rim of the tube to aid continuous or circulating flow in horizontal position, if this is required. The size or position of the orifices determines the air/liquid ratio within the tube and this may be used with advantage to adjust the ratio for any particular manufacturing process. Preferably the positioning of the tubes within these recesses is aided by an assembly means for instance in the form of a grid, lattice or perforated plate, providing additional support against lateral movement or dislocation.

The recesses on the manifold plate to receive the tubes may be arranged to obtain a maximum utilisation of surface. For instance these recesses and the tubes may be disposed around the central supporting member in groups arranged in concentric circles or in a manner providing a triangular arrangement with approximately equal distances between neighbouring tubes.

The openings or ports on the manifold plates are preferably adapted to receive or be equipped with means connecting to sources or containers of liquid or gaseous supplies or products or to the atmospheric environment through appropriate gas filters. For instance one of the openings may be equipped with a small tube adaptor which would connect the opening with a tube serving to supply and discharge the liquid medium or suspension of cells. The other opening at the opposite end plate may be used to be connected in a similar manner to a gas filter to provide an outlet for excess gas (e.g. carbon dioxide) or to maintain the system in equilibrium with the air.

Although it is one advantage of the present invention that the apparatus may be served by a single inlet/outlet opening or port and service tube in cases of batchwise processing, a continuous through-flow can also be achieved with the consequential advantages of liquid exchange during cell growth if the openings are simultaneously used for inflow at one end and outflow through the second opening at the other end. This possibility illustrates the adaptability and versatility of the apparatus for both types of operations and automation.

The service tube may take the form of a supply pipe or duct, and is advantageously made of a flexible tubular material. Tubes of heavy wall silicone, or other sterilizable material, have been found suitable for use at both ends, being appropriately equipped for instance with a single valve or preferably a clip for easy handling. The gas filter may simply consist of a cotton-wool plugged tube attached to the service tube, or may be a depth filter (e.g. Seitz-type) or a membrane filter, both contained in holders.

Tripod pressure members may be attached to either end of the central support, lying flush against the manifold plates to afford a uniform pressure on the plates. The pressure may be attained by adjusting the nut attached to the exterior of the pressure member to the required torque. This may be indicated by the thickness of the gasket inserted between the parts of the manifold plate. For instance if the gasket is of hard rubber, its thickness under pressure may be conveniently reduced to less than half of the original.

The culture vessel may be rolled on standard drum-rolling equipment. This may consist of a pair of wheels at both ends of the equipment supporting the cylindrical surface of the manifold plate, conveniently one or more of these being operatively connected to a driving means, the others being free wheels contributing to the support and location of the revolving vessel. Both types of wheels may be mounted on general supporting means such as a framework, foundation or movable structure.

It is preferred however to use a combined rolling machine/trolley driven for instance by an electric motor, whereby handling is minimised. In operation the culture vessel may be rolled at speeds ranging from 4 to 60 rev./h. for monolayer cultures: outside these limits the distribution of cells on the surface of the walls of the tube is far from uniform, thereby counteracting the benefits gained from the rolling. The rolling speed for optimum even distribution of inocula has been found to be from 5 to 20 rev./h., preferably 10 to 15 rev./h. For suspended cultures a speed of about 10 to 30 rev./min. is preferred.

The present invention in a particular aspect therefore provides an apparatus, which comprises a vessel as hereinbefore defined with a service tube connected to the first opening and/or a gas filtering tube connected to the second opening. In a further aspect the apparatus also comprises general supporting means or driving means, which may include a rolling mechanism, and a power source. The supporting means may take the form of a trolley.

The rolling part of the apparatus according to the present invention may easily be detached from the general supporting and driving means and turned into a position vertical in respect of the culture tubes. The liquid medium can thus be introduced into the apparatus through the service tube connected to the inlet/outlet opening by pumping the liquid from a delivery siphon attached thereto by means of gravity or air pressure applied to the siphon air inlet. The discharge of the liquid after the culturing process may be effected by placing the same part of the apparatus in a reverse position and allowing the liquid to flow out through the outlet opening and its connected service tube into appropriate sterile containers.

Application of the apparatus to the production of virus or viral antigens in monolayer tissue cultures may be carried out following well-known procedures.

The culture vessel containing a suspension of cellular inoculum in a growth medium is rolled at a low speed and the system incubated at 37° C. until a complete monolayer of cells has formed. After removal of the medium a suspension of the virus inoculum in a maintenance medium is fed in and the rolling continued with resultant virus adsorption. More maintenance medium is added and the system further incubated, while still rolling, at the required temperature for virus propagation. The cell-free virus or antigen may be harvested by draining off the medium and/or the cell-associated virus or antigen is recovered by removal of the cells from the tube walls by conventional physical or chemical methods.

In another aspect the present invention provides a method of cultivating microbiological material in liquid suspension, comprising the stages.

(1) introducing the initial liquid suspension batchwise, intermittently or continuously through the first opening of the culture vessel, as hereinbefore defined, and adjusting or controlling the gas/fluid volume ratio as required;

(2) rolling the culture vessel about a horizontal axis until the required biological conditions have been attained; and (3) removing or discharging the resulting, modified liquid suspension through either of the openings of the culture vessel.

The microbiological material may comprise cell systems, cell lines, bacteria and the like. As used herein and throughout the specification liquid suspensions of the microbiological material include appropriate media such as aqueous nutrient systems in addition to the cells.

The culture vessel can be rolled as a sealed unit but, if required, continuous gas control may be applied, for example to adjust the carbon dioxide content, and/or chemical agents or nutrients may be supplied or removed, for example to adjust the pH value of the system.

An embodiment of the invention will now be described by way of illustration only with reference to the accompanying drawings.

FIG. 1 is a partial section through a sector along the longitudinal axis of the culture vessel.

FIG. 2 is a planar view of the inner face of one of the manifold plates.

Figure 3:
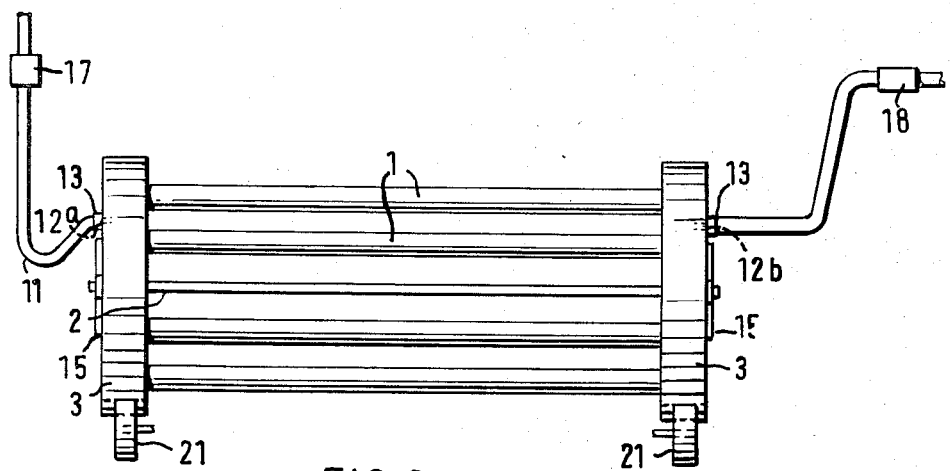
FIG. 3 shows a side view of the apparatus including the hose connectors, service tubes and accessories.

Referring to FIGS. 1 to 4, the apparatus comprises 18 standard borosilicate glass culture tubes 1 (2 of which are shown herein) of substantially uniform diameter and length, of approximately 4 cm. and 60 cm. respectively, mounted in groups of 6 and 12 in two concentric circles around a centrally positioned square section tie rod 2 and held firmly together and interconnected by a manifold plate 3, consisting of two closely aligned parts of which part 3a is constructed of Monocast Nylon 901 and part 3b is constructed of steel.

Culture tubes 1 are received and located within annular recesses 4 on one face of plate part 3a, aided by an aluminium assembly plate 5 lying on the surface of plate part 3a. Tubes 1 are held in position and protected against lateral movement by holes 6 within aluminium assembly plate 5.

The communicating channel system within the manifold plate part 3a consists of annular recesses 7 connected to the culture tubes 1 by tube orifices 8 and covered by a gasket 9 of hard rubber (Belldam Rubber Co.,) pressed onto the surface of plate 3a by plate part 3b to provide watertight sterile conditions, the inner and outer channels intercommunicating through a passage 10.

Passage 10 is also connected to a service tube 11 (FIG. 3) through a single inlet/outlet opening 12a and, on the other manifold plate, to a gas filter opening 12b by means of hose connectors or adaptors 13. A gasket of the soft tube sealing type is inserted between the rims of culture tubes and the bottom of recesses 4 to aid the sealing of the whole system.

The tie rod 2 is located within a central assembly passage 14, the dimensions of which are such that the rod is held tightly and firmly in position. The rod is provided at its extreme end with a tripod pressure member 15, which lies flush against manifold plate part 3b when the apparatus is assembled. A nut 16 on the screw-threaded outer end of the tie rod 2 abuts against the exterior of member 15, and is adjustable to give the torque required to attain the pressure necessary for efficient sealing. At the other end of the rod, the rod ending may be welded to the tripod member.

As seen on FIG. 3 the inlet/outlet opening 12a is joined by the hose connector 13 to a heavy wall silicone service tube 11 which is supplemented by a delivery siphon (not shown) and a clip 17 for controlling the rate of flow. The second opening 12b is also equipped with hose connector 13 to a gas filter assembly 18, comprising glass cotton-wool-plugged filters attached to short lengths of heavy wall silicone tubing.

Figure 4:
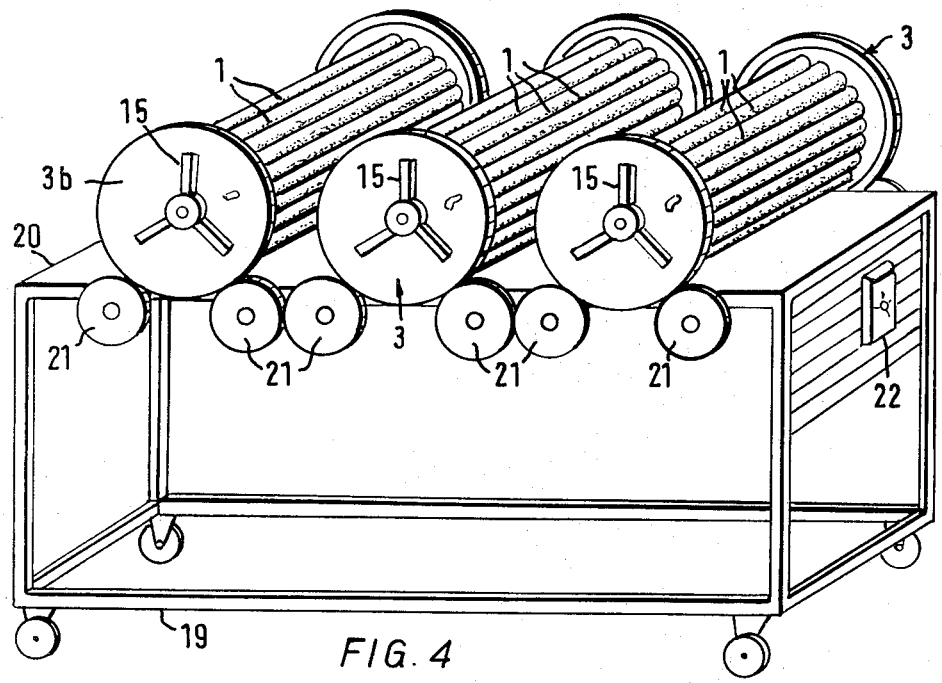
FIG. 4 shows an assembled apparatus with rolling and driving means on a movable trolley.

Referring to FIG. 4, the combined rolling machine and trolley which provides the general supporting and driving means for the above apparatus consists of a rigid square-section steel framework 19, having a steel flush top shelf 20, rolling machinery mounted under said shelf 20 which drives wheels 21 on either side of it, and a motor 22. The apparatus vessels straddle the shelf horizontally for rolling or stand vertically on it for manipulation.

Figure 5:
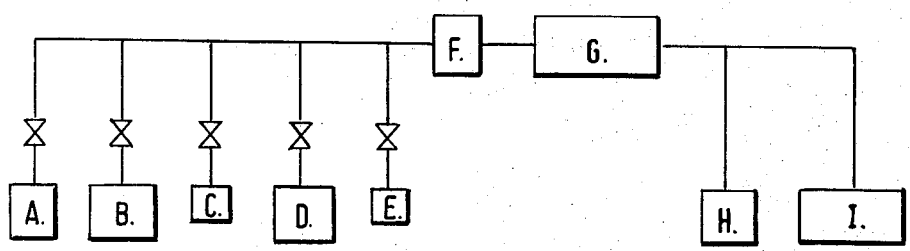
FIG. 5 is a system diagram of a continuous automated system incorporating the above vessel.

FIG. 5 shows the way in which the components essential to the production of vaccine may be interconnected with the culture vessel, as hereinbefore defined, in the automated system. The tanks containing the cell culture growth medium, virus seed, maintenance medium and enzymatic agent are fitted with sterile valves, which are operated mechanically by the control system, programmed to provide flows according to a predetermined time schedule. A waste reservoir for collection of overflow and waste products may be interposed between the culture vessel and the tank for storage of the final product.

The use of the apparatus is illustrated by way of example only as follows:

EXAMPLE $7\times10^8$ chick embryo cells are suspended in 2.7 litres of Eagles medium containing calf serum (Eagle H. Science, 1955, *122*, 501) under sterile conditions in a conventional bottle. A culture vessel having a growth surface area of 13,570 cm.$^2$ is prepared by placing it in a vertical position on the trolley with the inlet/outlet tube at the front of the bottom plate and the air filter free. The bottle is connected to a delivery siphon and the siphon in turn coupled to the inlet/outlet tube. The suspension is then transferred under gravity into the culture vessel and the flow controlled by means of a spring clip. A concentration of cells of $5\times10^4$ in a volume of 0.2 ml. medium/cm.$^2$ and a ⅕ of a column length of liquid is thereby provided, giving the preferred gas/fluid ratio of 4:1.

The apparatus is then turned quickly through 90° and rolled in the horizontal position at 5 rev./h., the optimium rotational speed for even adsorption of these cells, while being incubated at 37° C. for 4 to 5 days. A complete monolayer of cells is thereby formed as may be observed by microscopic examination, using a microscope with a built-in illumination and a locating device for a 4 cm. tube. The culture vessel is then placed vertically and the growth medium drained from the vessel under gravity into the siphon bottle and the monolayer of cells washed with balanced salt solution.

New castle disease virus inoculum at 10 $TCID_{50}$ (tissue culture infective dosage (50%)) is suspended in 150 ml. of "Maintenance Medium 199" (Morton et al., Proc. Soc. Exp. Biol. Med., 1950, 73, 1), transferred into the culture vessel (representing approx. 0.01 ml./cm.²) and the vessel rolled in the horizontal position for 1 to 3 hours for virus adsorption to occur. The monolayer is then rinsed with the same medium, a further 2.7 litres of maintenance medium fed in as before and the rolling apparatus incubated at the required temperature for virus propagation.

The cell-free virus is harvested at intervals by draining the medium from the vessel into a sterile container and re-feeding wth fresh medium as required with the culture vessel each time in the vertical position. The cell-associated virus is recovered by introducing a trypsin/versene (ED7A) solution and rolling the vessel for a few minutes whereupon the cells are released from the walls of the vessel.

What I claim is:

1. A culture vessel, comprising a plurality of parallel culture tubes of substantially uniform length mounted around a centrally positioned supporting member by manifold plates at each of its two ends, said plates being of circular disc shape bounded by a cylindrical surface and exerting axial pressure on the tubes to seal the ends thereof, the two plates (a) having communicating channels, which are adapted to interconnect all the tubes and are provided with a common inlet/outlet first opening on one of the end-plates, said opening being adapted to be connected to a service tube equipped with flow controlling means, and a common second opening on the other end-plate, said second opening being adapted to be used with a filter tube, (b) being mounted on the supporting member and (c) being adapted to locate and hold the tubes to form a sealed vessel capable of being detached from general supporting means and of being rolled on free or driving wheels or rollers.

2. A culture vessel as claimed in claim 1, wherein each manifold plate is constructed from a plurality of plates in face-to-face contact.

3. A culture vessel as claimed in claim 2, wherein each communicating channel is contained entirely within the plate part immediately adjacent to the tubes.

4. A culture vessel as claimed in claim 1, wherein the surface of the plate part immediately adjacent to the tubes is recessed to locate each tube.

5. A culture vessel as claimed in claim 2, wherein a perforated assembly plate is provided to aid location of the tubes within the recesses.

6. A culture vessel as claimed in claim 1, wherein the supporting member is a single tie-rod, of noncircular cross-section.

7. A culture vessel as claimed in claim 1, wherein the tubes have an internal diameter of from 1 to 10 cm., preferably 4 cm.

8. An apparatus, which comprises a culture vessel, as defined in claim 1, with a service tube connected to the first opening and a gas filtering tube connected to the second opening.

9. An apparatus as claimed in claim 8, which also comprises general supporting means and driving means.

10. An apparatus as claimed in claim 9, wherein the supporting means is a trolley.

References Cited

UNITED STATES PATENTS

| | | | |
|---|---|---|---|
| 3,732,149 | 5/1973 | Santero | 195—142 X |
| 3,338,795 | 8/1967 | McBee | 195—127 |

A. LOUIS MONACELL, Primary Examiner

R. B. PENLAND, Assistant Examiner

U.S. Cl. X.R.

195—1.7, 139, 142